US006462835B1

(12) United States Patent
Loushin et al.

(10) Patent No.: US 6,462,835 B1
(45) Date of Patent: Oct. 8, 2002

(54) IMAGING SYSTEM AND METHOD

(75) Inventors: Robert S. Loushin, Eagan, MN (US); Mark A. Peterson, River Falls, WI (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 0 days.

(21) Appl. No.: 09/353,997

(22) Filed: Jul. 15, 1999

Related U.S. Application Data

(60) Provisional application No. 60/092,867, filed on Jul. 15, 1998.

(51) Int. Cl.[7] .............................................. G06K 15/00
(52) U.S. Cl. ........................ 358/1.9; 382/167; 358/506
(58) Field of Search .......................... 358/518; 382/162, 382/167; 758/1.9, 506, 487

(56) References Cited

U.S. PATENT DOCUMENTS

| | | | |
|---|---|---|---|
| 2,571,697 A | 10/1951 | Evans | 95/2 |
| 4,154,523 A | 5/1979 | Rising et al. | 355/38 |
| 4,159,174 A | 6/1979 | Rising | 355/38 |
| 4,636,845 A | 1/1987 | Alkofer | 358/80 |
| 4,845,551 A | 7/1989 | Matsumoto | 358/80 |
| 5,117,293 A | 5/1992 | Asada et al. | 358/298 |
| 5,121,198 A | 6/1992 | Maronian | 358/76 |
| 5,134,573 A | 7/1992 | Goodwin | 364/525 |
| 5,278,641 A | 1/1994 | Sekizawa et al. | 358/527 |
| 5,311,251 A | 5/1994 | Roule et al. | 355/77 |
| 5,337,130 A * | 8/1994 | Satoh | 355/77 |
| 5,357,352 A | 10/1994 | Eschbach | 358/518 |
| 5,386,304 A | 1/1995 | Suzuki | 358/458 |
| 5,489,996 A | 2/1996 | Oku et al. | 358/518 |
| 5,497,431 A | 3/1996 | Nakamura | 382/162 |
| 5,579,131 A | 11/1996 | Kusumoto et al. | 358/518 |
| 5,667,944 A | 9/1997 | Reem et al. | 430/359 |
| 5,703,700 A | 12/1997 | Birgmeir et al. | 358/487 |
| 5,719,661 A | 2/1998 | Terashita | 355/38 |
| 5,725,999 A * | 3/1998 | Merkel | 340/504 |
| 5,781,315 A | 7/1998 | Yamaguchi | 358/520 |
| 5,832,133 A | 11/1998 | Smith | 382/254 |
| 5,881,171 A * | 3/1999 | Kinjo | 382/199 |
| 5,987,222 A * | 11/1999 | Terashita | 395/109 |

FOREIGN PATENT DOCUMENTS

| | | | |
|---|---|---|---|
| EP | 0 129 446 A2 | 12/1984 | H04N/1/46 |
| EP | 0 667 706 A1 | 8/1995 | H04N/1/60 |

OTHER PUBLICATIONS

American National Standard for Photography (Film) —135–Size Film and Magazine–Sepcification, American National Standard Institute, New York, New York (1994).

Goll E et al., *Journal of Applied Photographic Engineering*, 5(2):93–104 (1979).

* cited by examiner

*Primary Examiner*—Jerome Grant, II
(74) *Attorney, Agent, or Firm*—Shumaker & Sieffert, PA

(57) ABSTRACT

A system and method for correction and reconstruction of digital color images make use of one or more of a set of algorithms for color calibration and correction, and reconstruction. An algorithm for optimized bit depth reduction also can be used to match the response curve of the scanner to that of the scanned media, thereby improving signal-to-noise ratio and decreasing artifacts such as pixelization, which can result from sampling the tone curve too coarsely. In a photographic film application, in particular, a color calibration and correction algorithm enables correction of the image for variations in hue from film type to film type, over-exposure or under-exposure, exposure-induced hue shifts, hue shifts caused by lighting effects, processing related hue shifts, and other variables in film processing, while preserving overall hue of the subject matter in the originally photographed image. An image reconstruction algorithm allows creation of look-up tables (LUTs) that create a visually pleasing version of the image when applied to the original data.

34 Claims, 6 Drawing Sheets

IMAGING SYSTEM AND METHOD

This application claims priority from U.S. Provisional Application Ser. No. 60/092,867, filed Jul. 15, 1998, the entire content of which is incorporated herein by reference.

TECHNICAL FIELD

The present invention relates to techniques for scanning and reproducing images and, more particularly, to techniques for processing scanned image data to generate a digital image for display or reproduction.

BACKGROUND

Creation of positive images from photographic negatives can be a difficult and imprecise process. The fundamental problem is that the consumer wants to receive images that are consistently the correct color balance and brightness despite variables in the photographic imaging process. Sources of variation in the photographic imaging process include: (a) variations in spectrophotometric and sensitometric characteristics from film type to film type, (b) emulsion to emulsion variation within a film type, due to film manufacturing variability, film shelf aging before exposure, latent image fading after exposure, dark fading after processing, and chemistry variations in the film processing step, (c) illumination variation at the time of photography, which can cause both color balance variation in the image and exposure level variation, and (d) other variations, such as those arising from camera lens color differences. The challenge in photographic color correction is compensating for each of the above variables, while at the same time preserving color deviations from neutral in the image that are caused by the subject matter that was photographed.

SUMMARY

The present invention is directed to a system and method for correction and reconstruction of color images generated by a scanner. The system and method make use of one or more of a set of algorithms for color calibration and correction, and reconstruction of scanned images. The images can be scanned, for example, from reflective or transmissive film or paper. In particular, the images can be scanned from processed negative or positive photographic film. Other examples include photothermographic or thermographic film, electrographically printed paper, inkjet printed paper, and the like. For ease of illustration, all of the above media will be referred to herein as "film."

In a photographic film application, for example, a color calibration and correction algorithm enables correction of the image for variations in hue from film type to film type, over-exposure or under-exposure, exposure-induced hue shifts, hue shifts caused by lighting effects, processing related hue shifts, and other variables in film processing, while preserving overall hue of the subject matter in the originally photographed image. An image reconstruction algorithm allows creation of look-up tables (LUTs) that create a visually pleasing version of the image when applied to the original data. If desired, the system and method also may use an algorithm for optimized bit depth reduction that more effectively matches the response curve of the scanner to that of the film, thereby improving signal-to-noise ratio and decreasing artifacts such as pixelization, which can result from sampling the tone curve too coarsely.

In one embodiment, the present invention provides a method for correcting a digital color image scanned from film, the method comprising producing average color value data for the scanned color image, performing exposure correction of the image using the average color value data and exposure calibration data, performing chromatic correction of the image using a subject failure suppression boundary following the exposure correction, generating image correction data representative of the exposure correction and the chromatic correction, and applying the image correction data to the image to produce a corrected color image.

In another embodiment, the present invention provides a system for correcting a digital color image scanned from film, the system comprising means for producing average color value data for the scanned color image, means for performing exposure correction of the image using the average color value data and exposure calibration data, means for performing chromatic correction of the image using a subject failure suppression boundary following the exposure correction, means for generating image correction data representative of the exposure correction and the chromatic correction, and means for applying the image correction data to the image to produce a corrected color image.

In a further embodiment, the present invention provides a method for reconstructing a digital color image scanned from film, the method comprising producing average RGB color value data for the scanned color image, performing exposure correction of the image using the average color value data and exposure calibration data, performing chromatic correction of the image using a subject failure suppression boundary following the exposure correction, generating image correction data representative of the exposure correction and the chromatic correction, generating reconstruction lookup tables (LUTs) based on the color correction data and the average color value data, each of the reconstruction LUTs representing a curve for reconstruction of one of the RGB color channels for the image, and applying each of the reconstruction LUTs independently for the respective RGB color channels to produce a reconstructed color image.

In an added embodiment, the present invention provides a system for reconstructing a digital color image scanned from film, the system comprising means for producing average RGB color value data for the scanned color image, means for performing exposure correction of the image using the average color value data and exposure calibration data, means for performing chromatic correction of the image using a subject failure suppression boundary following the exposure correction, means for generating image correction data representative of the exposure correction and the chromatic correction, means for generating reconstruction lookup tables (LUTs) based on the color correction data and the average color value data, each of the reconstruction lookup tables representing a curve for reconstruction of one of the RGB color channels for the image, and means for applying each of the reconstruction LUTs independently for the respective RGB color channels to produce a reconstructed color image.

In another embodiment, the present invention provides a method for correcting a digital color image scanned from film, the method comprising producing average color value data for the scanned color image, performing exposure correction of the image using the average color value data and exposure calibration data, performing chromatic correction of the image using a subject failure suppression boundary following the exposure correction, generating image correction data representative of the exposure correction and the chromatic correction, and applying the image correction data to the image to produce a corrected color image.

In a further embodiment, the present invention provides a system for correcting a digital color image scanned from film, the system comprising means for producing average color value data for the scanned color image, means for performing exposure correction of the image using the average color value data and exposure calibration data, means for performing chromatic correction of the image using a subject failure suppression boundary following the exposure correction, means for generating image correction data representative of the exposure correction and the chromatic correction, and means for applying the image correction data to the image to produce a corrected color image.

Other advantages, features, and embodiments of the present invention will become apparent from the following detailed description and claims.

DESCRIPTION OF DRAWINGS

Like reference numbers and designations in the various drawings indicate like elements.

DETAILED DESCRIPTION

Figure 1:
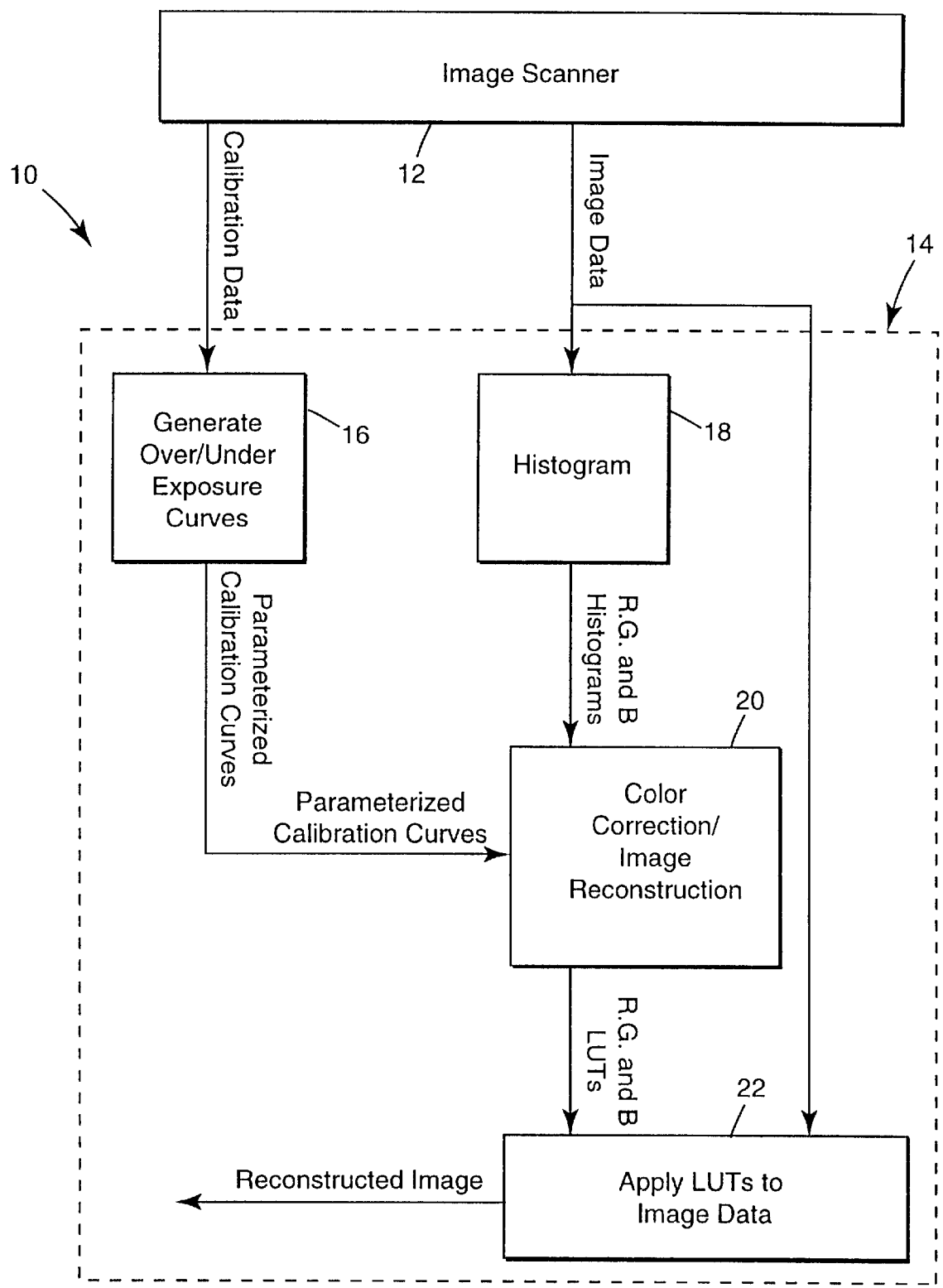
FIG. 1 is a functional block diagram of a system for correction and reconstruction of scanned color images.

FIG. 1 is a functional block diagram of a system 10 for correction and reconstruction of scanned color images. As shown in FIG. 1, system 10 may include an image scanner 12, and a software-based system 14 incorporating an exposure curve generation module 16, a histogram generation module 18, a color correction/image reconstruction module 20, and a LUT conversion module 22. For an exemplary photographic film scanning application, scanner 12 may take the form of a photographic film image scanner of the type typically used to scan negative film in roll format. Exposure curve generation module 16 processes calibration data generated by scanner 12 in response to calibration images, and produces calibration curves for correction of overexposed and underexposed images. The calibration curves can be stored for later use. Histogram generation module 18 processes image data generated by scanner 12 in response to actual user-provided images, and produces a histogram representing the distribution of the gray levels for the red, green, and blue (RGB) channels within the image. Color correction/image reconstruction module 20 processes the histogram generated by histogram generation module 18 and calibration curves generated by exposure curve generation module 16 to produce correction LUTs for each of the red, green, and blue color separations. Further, color correction/image reconstruction module 20 generates LUTs representative of a image reconstruction curve. LUT conversion module 22 applies the reconstruction LUTs to the actual image data generated by scanner 12 to produce a reconstructed image that can be used to generate high-quality reproductions of the original imagery.

Optimized Bit Depth Reduction

Scanner 12 may conform substantially to conventional image scanners useful in scanning film in a transmissive or reflective mode. In one embodiment, scanner 12 may incorporate scanning optics such as a line scanner oriented to apply a beam of light to processed, i.e., developed, photographic film, a light detector such as a CCD line scan array arranged to receive light transmitted through the film, and appropriate color filters for acquisition of color separation data from the CCD line scan array, e.g., red, green, and blue (RGB) color separation data. The light detector alternatively could include separate detector elements that are sensitized to respective color separations, eliminating the need for color channel filters. As an example, scanner 12 can be configured to scan each color separation at n-bit gray level accuracy, and then pass the resulting data through a n to m-bit conversion lookup table (LUT) in hardware integrated with the scanner, wherein m is less than n. In this manner, scanner 12 can perform bit depth reduction to more readily maintain a high scan throughput in terms of film frames scanned per minute.

The architectures of some scanners do not allow the entire n-bit dynamic range to be used to its full potential. For example, a scanner sometimes does not use the entire dynamic range available because some of the dynamic range is used to accommodate scanner-to-scanner variability caused by manufacturing variations and lamp brightness variations caused by aging. In some cases, as much as half of the dynamic range of the scanner can be dedicated to accommodating such variations.

Also, in some scanners, neither the exposure intensity nor the exposure time can be changed from image to image. As a result, over-exposures, normal exposures, and under-exposures must all be scanned within a common dynamic range. This limitation severely reduces the remaining dynamic range for any given image, because each image will have only one exposure level.

Finally, in a photographic film scanning application, photographic film does not have a linear relationship between transmittance, which is what the CCD detector measures, and exposure. Instead, this relationship is logarithmic. Consequently, gray level resolution which is adequate (or even more than needed) in the lighter areas of the film can provide inadequate resolution in the darker areas. Therefore, if scanner 12 undertakes a simple linear bit depth reduction from the n-bit input to the m-bit output, the light areas of the film are oversampled and the dark areas undersampled. This problem is most evident, on negative processed photographic film, in highlights of overexposures. In this case, the undersampling causes the measured levels to be severely quantized, leading to pixelization in the reconstructed image.

With the effects described above, after the n to m bit conversion, typical images produced by the scanner may have a substantially reduced dynamic range. Such a dynamic range is quite adequate for many applications, especially if the dynamic range is properly used. However, individual color separations of some images may have even fewer gray levels. In some cases, the number of gray levels may be too few to reconstruct an acceptable image. Images that represent scenes with low brightness ratio are by definition scenes with a lower number of gray levels. Accordingly, an algorithm for optimized bit depth reduction can be implemented within scanner 12 whereby the gray levels available in the 10 bit image are used more wisely to minimize artifacts. The algorithm can be implemented in hardware, firmware, software or a combination thereof within scanner 12. Alternatively, optimization of bit depth reduction could be assigned to a device external to scanner 12 that receives the n-bit, e.g., 10-bit, output from the scanner. As a further alternative, scanner 12 may produce n-bit data that is subjected to optimized bit depth reduction via a software module associated with system 10. In particular, optimized bit depth reduction can be integrated with the color correction algorithm and carried out by color correction/image reconstruction module 20. In this manner, optimized bit depth reduction may form part of the color correction.

The inherent transmittance of photographic film is logarithmic. Therefore, it makes sense for the detector measuring transmittance to measure logarithmically as well. The tone curve optimization algorithm takes this approach, and thereby reduces the complexity of the conversion. According to the tone curve optimization algorithm, the values of the darkest usable portion and the lightest exposed portion of the film are measured in the 10-bit space. The range is then scaled using a gamma correction curve, $y=ax^g+b$, instead of a logarithmic curve, mapping the range to a $2^m$-level space. The $2^m$-level space is mapped, however, subject to the constraint that the maximum step size is 1. This constraint forces the algorithm to use every available m-bit value, keeping the measurement as smooth as possible. The use of a gamma correction type curve instead of a logarithmic curve is preferred because the gamma curve is easier to handle from a computational standpoint. Also, from a practical standpoint, the two curves have a very similar shape, so that in actual use, the results are similar with either curve.

An advantage of this technique is that it better utilizes the inherent n-bit accuracy in that portion of the transmittance curve of the film where it is most needed, i.e., in lighter areas, while giving up some accuracy in portions of the transmittance curve that are being oversampled. In other words, accuracy is improved for the lighter portions of the processed photographic film and reduced in the darker portions. Thus, there is gain in accuracy where it is needed without appreciably sacrificing accuracy in any other portion of the film. Utilizing this technique significantly decreases the level—both frequency of occurrence and severity—of pixelization artifacts.

Color Calibration and Correction

In another embodiment, the present invention implements an algorithm for color correction of digitized imagery, such as that scanned from processed photographic film, or other film or paper media. Color correction can be implemented in software, in part by exposure curve generation module 16, which generates calibration exposure curves for correction of variations due to under-exposure or over-exposure of a scanned image, histogram generation module 18, which generates histogram information representative of density levels for a given color separation, and color correction/image reconstruction module 20, which generates corrections based on the histogram information and the calibration exposure curves. This software implementation can be arranged in program code that is accessed and executed by a processor.

The program code can be loaded into memory from another memory device, such as a fixed hard drive or removable media device associated with system 10. The processor may take the form of any conventional general purpose single- or multi-chip microprocessor such as a Pentium® processor, a Pentium Pro® processor, an 8051 processor, a MIPS processor, a Power PC® processor, or an Alpha® processor. In addition, the processor may be any conventional special purpose microprocessor. Further, the processor can be integrated within a personal computer or computer workstation that incorporates an input device, such as a conventional keyboard and pointing device such as a mouse or trackball, and an output device, such as a CRT or flat panel computer monitor that provides textual and/or graphic output to the user.

The color correction algorithm can be applied, for example, to digitized output data generated according to a optimized bit depth reduction algorithm, as described above. Alternatively, the color correction algorithm can be applied to output data that has not been subject to bit depth reduction.

Algorithms for achieving accurate color correction have been developed for conventional photographic printing equipment. The so-called "integration to gray" theory, for example, is disclosed in U.S. Pat. No. 2,571,697 to Evans. A color correction algorithm based on the "integration to gray" theory can be implemented using a transformation from red-green-blue color space to a hue, saturation, and lightness (HSL) space. A color correction algorithm in accordance with this embodiment may use the "integration to gray" approach. This algorithm is designed to work in any of a number of HSL color spaces.

HSL color spaces can be expressed as either cylindrical coordinate systems or Cartesian coordinate systems, and generally have the following characteristics: (a) when the color space is expressed as cylindrical coordinate systems, variations along the theta axis are perceived by humans as shifts in the hue (e.g. red, yellow, green, cyan, blue, or magenta), variations along the radial axis are perceived as shifts in the saturation, e.g., low saturations are grayish, high saturations are intense or colorful, and variations along the z-axis are perceived as changes in the lightness of the object; and (b) when the color space is expressed as Cartesian coordinate systems, the x and y axes correspond to two opposite color pairs (frequently one is the red/green axis, and the other is the yellow/blue axis), and the z axis is again a lightness axis.

T space is one of several well known HSL color spaces. A T space is described, for example, in U.S. Pat. No. 4,159,174 to Rising and U.S. Pat. No. 4,154,523 to Rising et al. For implementation of the color correction algorithm in a photographic film application, T space may be desirable due to both its familiarity among film scanner users, and its ready correlation with the physical output of the film. Specifically, the x and y axes of T space are the GM (green/magenta) and ST (skylight/tungsten) axes. White objects illuminated by mixtures of outdoor lighting and indoor (incandescent) lighting appear at differing places along the S-T axis depending on the percentage of light from each source. This fact is useful in understanding the color correction algorithm described herein. Application of the algorithm in T space will be described for purposes of example. However, other possible HSL spaces would work just as well. Also, the conversion to the chosen space can be isolated to one small section of the computer code used to implement the algorithm, thereby facilitating ready change if use of another space is desired. A conversion to another color space could require, however, recalibration of the system and reselection of the subject failure suppression boundaries (SFSB or "woodpecker boundaries") and reconstruction targets, as will be described.

After the images have been scanned and output data has been produced, e.g., using an algorithm for optimized bit depth reduction within scanner 12 as described above, the color correction algorithm is applied to correct exposure level and remove unwanted color casts. The color correction algorithm is scanner independent. The first step of the algorithm is to generate a histogram of the number of pixels at each brightness level for each color separation. The histogram information is used, in part, to yield average color value data indicating the average color values within the image. Other conventional methods for producing average color value data can be used. With reference to FIG. 1, the generation of average color value data can be assigned to discrete histogram generation software module 18 within software system 14. The resulting histogram information for each color separation is passed into the color correction routine implemented within color correction/image reconstruction module 20, as shown in FIG. 1. It is notable that the histogram information is the only information about the color content of the scanned image that the color correction/image reconstruction module 20 need receive. This feature is advantageous for commercial settings in which scanner 12 is used to scan images from film having diverse origins and characteristics, such as film received from amateur photographers in a photo processing shop.

Module 20 calculates the average RGB level in the image by reference to the histogram information, takes the log of such levels to account for the gamma of the film, and converts the values to T space. T space is related to RGB space by a simple matrix multiplication. By examining the location (relative to a normal exposure of a standard gray scene) of the average coordinates of the scene in T space, the exposure level of the scene can be estimated. Also, any systematic color shifts caused by lighting or other external influences can be determined from the S-T and G-M coordinates of the scene. Because the comparison is made to a standard of the same film type, film type-to-film type variations can be eliminated by calibration. For further information concerning film type calibration, reference is made to E. Goll, D. Hill, and W. Severin, Journal of Applied Photographic Engineering, Vol. 5, Num. 2, Spring 1979, pp. 93–104.

In order to carry out the color correction, standard reference films are obtained for each film type that is scanned. Because over- and under-exposures undergo hue shifts as well as changes in lightness, it is necessary to calibrate against such shifts. Thus, the calibration film should consist of a normal exposure, an underexposure, and an overexposure of a reference scene that is, on average, neutral gray. An example of suitable calibration films are the True Balance calibration strips made by Aperion Company for calibrating conventional analog photoprinters. Other calibration films that satisfy the above criteria would suffice. For calibration, each image is scanned, averaged, the logs are taken, and converted to T space, just as for the images to be corrected. This data is stored for each film type under a file name for its unique film type identifier code, i.e., a DX code. DX codes for photographic film are discussed in detail in American National Standards Institute standard ANSI/NAPM IT1.14-1994. In this manner, calibration data is assembled for a variety of film manufacturers, film types, and film speeds. Many conventional film scanners include a bar code reader configured to read the DX code from a roll of film and pass it to processing software along with the scanned image data.

After image coordinates in T space have been calculated, the corrections required to move the image back to normal exposure and remove color casts are calculated in four steps: (1) exposure correction, (2) gray correction, (3) chromatic correction using the subject failure suppression (or "woodpecker,") boundary, and (4) final correction.

For exposure correction, step (1), image over- or underexposure is corrected by comparing the lightness value of the image to the lightness value of the standards for that DX code. The lightness correction is set equal to the difference between the image and the normal exposure standard. Color corrections along each of the color axes are calculated as a fraction of the color errors of the over- or under-exposure standard, depending on whether the image was determined to be over- or underexposed. The fraction chosen is the ratio of the distance between the image and the normal standard to the distance between the over- or under-exposed standard. This amounts to assuming that the exposure induced hue shift is linear with exposure. Although this is not exactly true, actual shifts are close enough to linear that, in practice, this assumption is quite usable. In other embodiments, the hue shift versus exposure curve could be modeled using spline, polynomial, or other curve-fitting functions.

These corrections are stored by the algorithm and applied to the image T space coordinates. After this step, there is a set of T space coordinates having a lightness of 0.0, meaning the image has the same exposure as a properly exposed neutral scene. The T space coordinates also have S-T and G-M values that are typically non-zero, and represent a mixture of lighting induced hue shifts, other objectionable hue shifts, and variations of the actual color of the scene from true neutral. At this stage, the algorithm has produce exposure-corrected T space coordinates of the image, notably prior to chromatic correction.

The exposure correction will introduce a desirable color shift in the corrected image if the over- or under-exposed image is not neutral relative to the normal exposure. This situation is common and is known as exposure dependent color shift. If the chromatic correction (using the subject suppression failure, or "woodpecker," boundary) were based on the exposure-uncorrected coordinates, the gray point would not be truly gray. Instead, the gray point would be away from gray by however far the exposure correction changed the S-T and G-M values. The color correction algorithm avoids this result by performing the chromatic correction after the exposure correction.

For gray correction, step (2), further color corrections are generated, but not yet applied, by calculating the difference between the normal exposure standard and the S-T and G-M values of the exposure-corrected scene. If applied, these corrections would make the average hue of the corrected image neutral gray. However, not all scenes are, on average, neutral gray. Accordingly, the gray correction data is held in abeyance for performance of the chromatic correction.

For chromatic correction using the subject failure suppression boundary, step (3), a comparison is made between the size of the preliminary color corrections previously determined from step (2) and a boundary in T space known as the subject failure suppression boundary, and colloquially known by those skilled in the art as the "woodpecker" boundary because of its resemblance to a profile view of the head of a woodpecker. This boundary is predetermined by examining the T space coordinates of many images, on an empirical basis, and hand picking a boundary which will provide appropriate correction. A line is projected from the origin of T space, through the coordinates of the preliminary color corrections of step (2), and to the point where the line intersects with the boundary.

A fraction is generated by dividing the distance of the correction from the origin of T space by the distance of the boundary from the origin at the point of intersection. If the fraction is below some lower limit (frequently 0.2), it is adjusted up to that lower limit. Then, the preliminary color corrections from step (2) are multiplied by the fraction to generate a new set of corrections. The purpose of this step is to remove the effects of lighting-induced hue shifts while not removing scene content-induced hue shift. When the exact position of the boundary is chosen, it is carefully selected with this goal in mind. Implementation of the color correction algorithm as described herein allows the number of points used to define the boundary to be varied easily depending on the characteristics of the film, application, and the expected subject. Also, the algorithm allows the easy use of a different boundary for each film type.

For the final calculation of corrections, step (4), the actual corrections to be applied to the scene are calculated by adding together the exposure corrections generated in step 1 and the gray level/chromatic corrections generated in step 3. These corrections are converted back to RGB space, where they represent relative shifts in the scaling of the RGB data. These shifts, and the original histograms representing the image, are passed onto the image reconstruction algorithm. The image reconstruction algorithm may conform substantially to that described below, or may be selected from other available algorithms. Accordingly, correction and calibration, in accordance with the present invention, can be practiced separately from image reconstruction, as described herein, and vice versa.

Image Reconstruction

An image reconstruction algorithm can be implemented in software by color correction/image reconstruction module 20. For image reconstruction, the only information available is the R, G, and B histogram information for the scanned image. Even after the color corrections have been applied, only one color—the average hue of the image—has been corrected. Moreover, it is not even known what calorimetric values that color had in the original scene of the scanned image. There is no known white or black point, because no relationships between the R, G, and B values of any given pixel are known. The relationships were lost when the histograms were made. Similarly, there is no information to facilitate location of key colors like flesh tones, foliage green, sky blue, or neutral gray. This lack of colorimetric information means that the image reconstruction algorithm must be largely ad hoc. It can only be based on a general knowledge of film behavior, knowledge of how the human visual system works, and assumptions about likely scene content. Therefore, the image reconstruction algorithm is highly heuristic, but has been observed to produce good image quality results despite the dearth of information concerning the original image.

Figure 2:
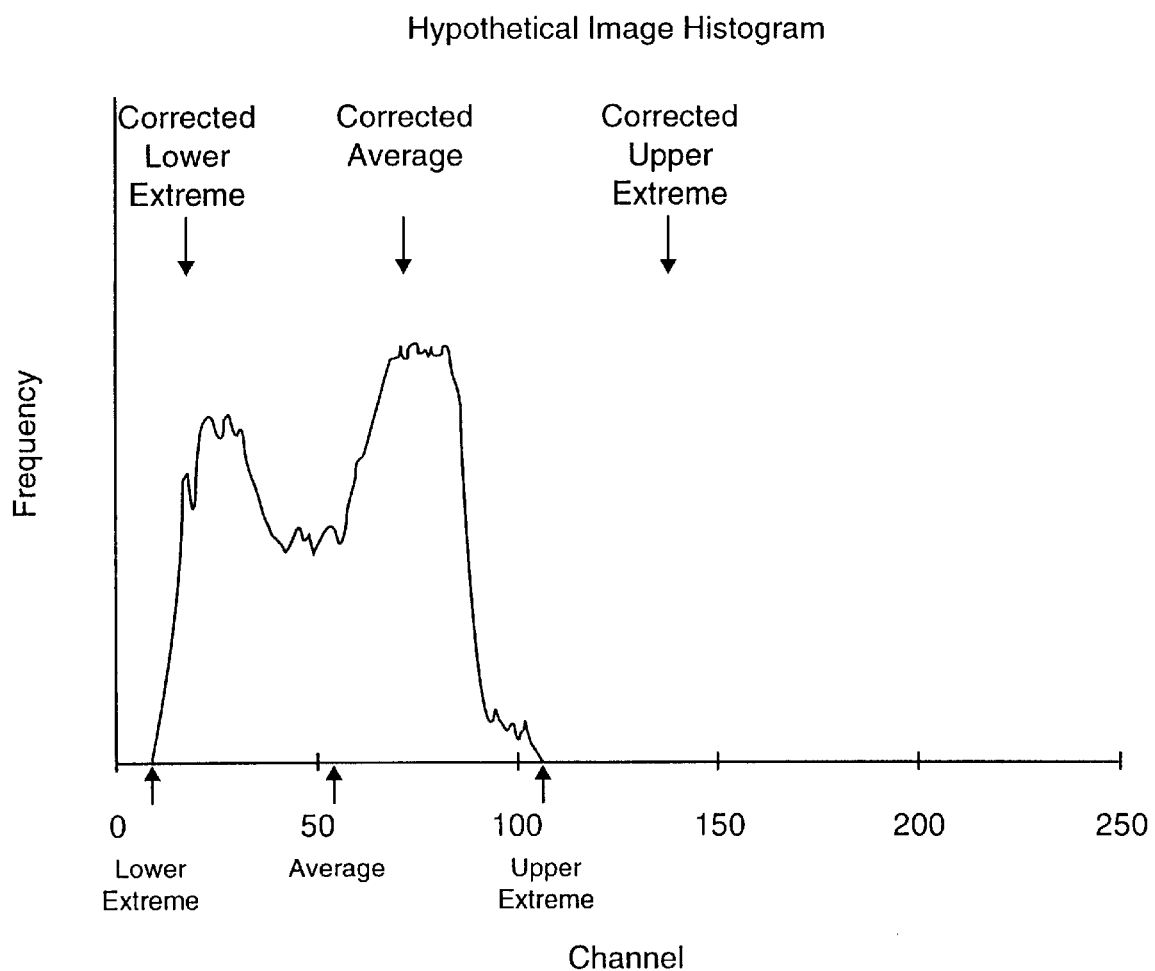
FIG. 2 is a conceptual graph of a histogram generated for a hypothetical scanned film image.

According to this image reconstruction algorithm, each channel (R, G, and B) is treated independently, and each step below is applied separately to each channel. First, a preliminary reconstruction LUT is calculated. The preliminary reconstruction LUT represents a "first estimate" of the reconstruction LUT, and is calculated by applying the scale factors calculated in the color correction algorithm to the integers between 0 and 255. Second, the algorithm locates extremes and midpoints. In particular, the lower and upper points of the histogram which actually contain data are located, as is the (uncorrected) average point. The preliminary reconstructed points corresponding to these three positions are also located, as illustrated by FIG. 2.

Next, a target color is determined. Specifically, the target for the average color to which the image is to be mapped is loaded from a file. This target color is conceptually a neutral gray. However, it may be chosen somewhat away from gray to accommodate the color characteristics of the final intended display device, if known. Because of compromises with other image appearance factors, a neutral gray in the final image may not actually be mapped to this color.

Figure 3:
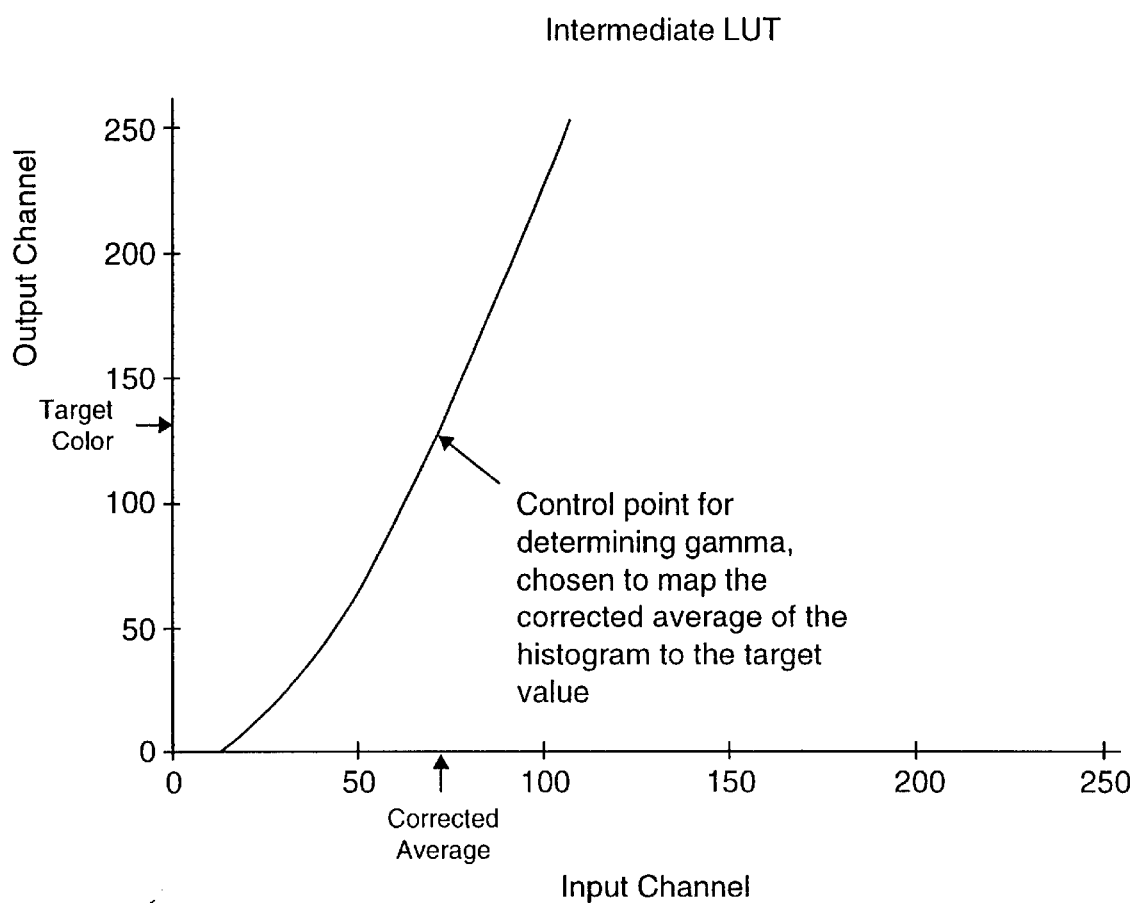
FIG. 3 is a graph of a color correction and image reconstruction curve for a scanned image.

Following determination of the target color, manual adjustments may be made, as will be described in greater detail later in this description. Gamma then is determined by calculating the parameters required to map the midpoint to the target color, while mapping the lower and upper ends of the histogram to 0 and 255, respectively. Mathematically, a, b, and g are calculated for the following equation: $y=a\,x^g+b$. Stretch of the gamma correction curve can be limited, if desired, as will be described in greater detail later in this description. A nearly final ("intermediate") version of the LUT is calculated next, using the gamma correction equation. An example of the curve represented by the LUT is shown in FIG. 3.

Figure 4:
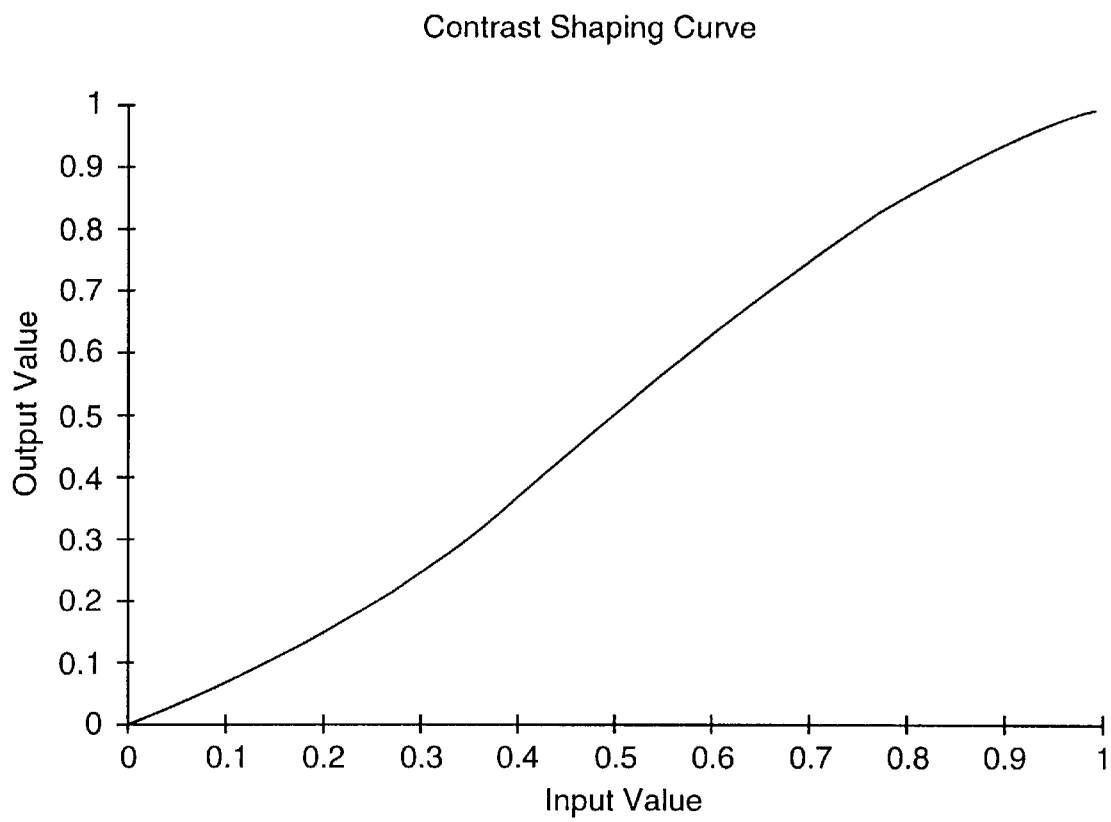
FIG. 4 is a graph of a contrast shaping curve for application to a curve as shown in FIG. 3.

The contrast of the final image can be adjusted by applying a contrast shaping curve, as shown in FIG. 4, as a separate look-up function, to the intermediate LUT. This step both suppresses overstretch and lends a more aesthetically pleasing appearance to the image. As shown in FIG. 4, the rounded sections at the ends of the shaping curve tend to suppress pixelization, which typically occurs in the brightest or darkest regions of the image, and the higher slope in the center increases midtone contrast. The purpose of the contrast shaping function is to modify the nearly final LUT to achieve aesthetically pleasing results in the reconstructed image. Many possible functions could be used for the contrast shaping function. Included below is a discussion of an exemplary contrast shaping function. The contrast shaping function, in this example, can be represented by the following equation:

$$y=(1-x)s_1 \tan h(m_1(x-0.5))+xs_2 \tan h(m_2(x-0.5))\tfrac{1}{2}$$

In the above equation, tanh represents the mathematical function known as a hyperbolic tangent. The function is used by scaling the nearly final output value of each channel to the range between 0 and 1 by dividing it by the value of the largest allowed output value. In an 8-bit system, for example, the largest allowed output value is 255. The scaled value is then inserted as x into the contrast shaping function. The resulting y value is scaled back to the range between 0 and the largest allowed output value by multiplying it by the largest allowed output value.

The constants $s_1$ and $s_2$ in the contrast shaping function are chosen to keep the output value between 0 and 1. Typically, constants $s_1$ and $s_2$ are chosen so that the lowest possible output value is 0 and the highest is 1. However, in some of the low contrast cases detected in the "limit stretch" step, they may be chosen so that the lowest possible output value is greater than 0 and/or the highest possible output value is less than 1. The constants $m_1$ and $m_2$ are chosen to control the slope of the curve, and therefore the contrast of the image, in the middle of the curve (corresponding to the midtones of the image) and the amount of curvature in the high and low values of the curve (corresponding to the highlights and shadows of the image). Increasing the curvature of the curve can cause it to have a lower slope, and hence lower contrast, in selected areas of the image. This can be useful for, among other things, minimizing the effects of pixelization artifacts. In the example curve shown in FIG. 4, $S_1=s_2=1/(2\tan h(0.5))$ and $m_1=m_2=1$. It is not necessary that $S_1$ equal $S_2$, or that $M_1$ equal $M_2$; they can be chosen separately. $S_1$ and $M_1$ primarily affect the shape of the curve for low x values, whereas $S_2$ and $M_2$ primarily affect the shape of the curve for high x values.

As a final step, if the film is negative film, the LUT is inverted so that it will create a positive image when applied to the image data. LUT conversion module 22 then applies the final correction LUT to the scanned image data to reconstruct the scanned image for reproduction. The reconstructed image can be stored as an image file for later use, or immediately printed as a positive image on a conventional film printing device.

The basic algorithm described above, without the manual adjustment and stretch limit steps, has been observed to provide good results in most instances, and especially with "well behaved" images, i.e. those containing more than 100 gray levels per separation and having histograms that are either approximately flat in the areas where there are data, or peaked toward the middle. However, it is sometimes desirable to manually adjust overall scene brightness, contrast, and/or color balance. For this reason, color correction/image reconstruction module 20 can be configured to allow input of such adjustments. Thus, in the manual adjustment step, brightness and color balance adjustments can be made by adjusting the color target for each separation up or down, depending on the direction and amount of change requested. Changing brightness involves adjusting all the channels equally, whereas changing color balance is achieved by adjusting them individually. Changing image contrast can be achieved by increasing or decreasing the slope of the contrast shaping curve.

As mentioned above, pixelization and quantization artifacts sometimes show up in images with relatively few gray levels in each separation. Because the reconstruction algorithm uses a non-linear mapping between input and output (this is done to reflect the fact that film response to exposure is non-linear; and in fact has substantially the same shape as the gamma correction curve), some gray levels end up with larger gaps between them and their neighbors than they would have in a linear reconstruction, while some end up with smaller gaps. Unfortunately, this gap variation can increase the artifacts in the large gap areas of the tone curve. This problem can be referred to as overstretch, because it results from stretching the dynamic range of the image too far in the attempt to make it fill the dynamic range of the output device. Overstretch can be detected and corrected in at least two ways.

First, if the overall dynamic range of the input image is below a given threshold, the contrast shaping curve can be adjusted to lower the contrast of the reconstructed image. This operation causes the reconstruction of a dynamically flat scene such as, say, an overcast sky, to be reconstructed as a gray image with subtle color and brightness variations, which is what it actually looks like. This is in contrast to having wildly modulated brightness shifts, which the basic algorithm could try to introduce by stretching the histogram to fill the whole range from 0 to 255. Second, images with histograms that are highly skewed to one end or the other can be identified. An example is a picture of campers gathered around a campfire at night. The image is mostly black, but has some light pixels corresponding to the fire. Consequently, this image exhibits good dynamic range and would not be detected by the dynamic range test described above. When the reconstruction stretches the average brightness point, which was in the middle of the hump of nearly black pixels, to the middle of the dynamic range, all the pixels darker than the average are overstretched. This case can be detected by directly looking for cases where the slope of the reconstruction curve is too high, and adjusting the brightness appropriately to bring it down.

Figure 5:
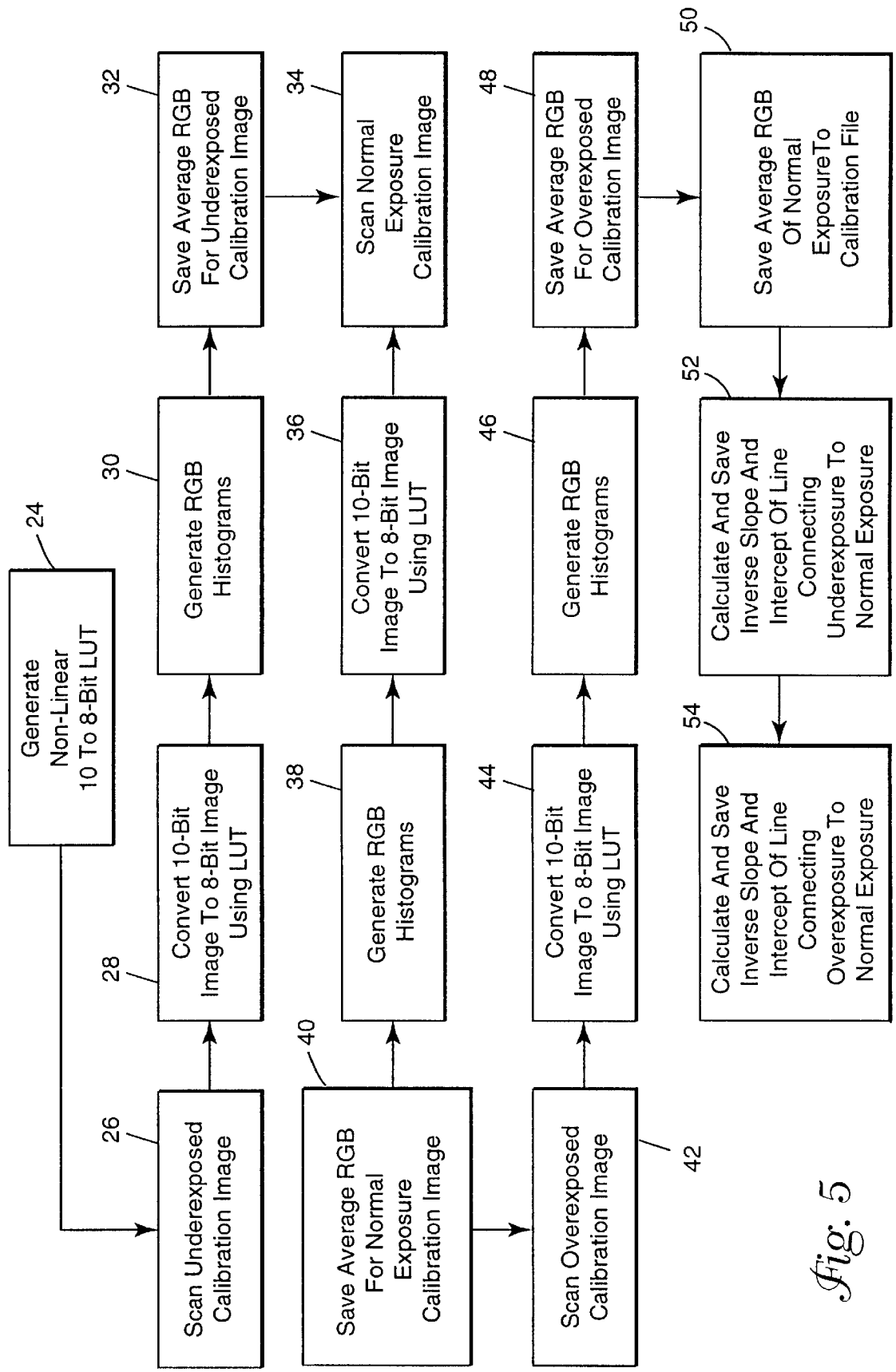
FIG. 5 is a flow diagram illustrating a scan calibration method implemented by a system as shown in FIG. 1.

FIG. 5 is a flow diagram further illustrating the operation of a scan calibration method implemented as described above. With reference to FIG. 5, a non-linear 10 to 8-bit LUT is first generated to permit optimization of the tone curve produced by scanner 12 following bit depth reduction, as indicated by block 24. Again, the non-linear LUT can be constructed as a gamma correction curve to better match the logarithmic response of the film. Also, a maximum step constraint can be imposed to ensure that the entire 255 value range is utilized. With the non-linear LUT pre-calculated, a calibration routine is undertaken.

Specifically, as indicated by block 26, an underexposed calibration image is scanned by scanner 12. The 10-bit scan of the underexposed image is then converted to an 8-bit image using the pre-calculated LUT, as indicated by block 28. Histogram generation module 18 next generates histogram information for each color separation, as indicated by block 30, and saves the average red, green, and blue values for the underexposed calibration image, as indicated by block 32. The saved average will be used in the image correction algorithm.

Next, a normal exposure image is scanned by scanner 12, as indicated by block 34. The 10-bit scan of the normal-exposure image is converted to an 8-bit image using the pre-calculated LUT, as indicated by block 36. Histogram generation module 18 next generates histogram information for each color separation of the normal-exposure image, as indicated by block 38. The average red, green, and blue (RGB) values are saved for the normal exposure calibration image, as indicated by block 40.

Next, an overexposed calibration image is scanned, as indicated by block 42, and converted to an 8-bit image, as indicated by block 44. Following generation of histograms, as indicated by block 46, the average red, green, and blue values are saved, as indicated by block 48.

The calibration information is then parameterized for use in the color correction algorithm. Specifically, the average red, green, and blue values for the normal exposure calibration image are stored to a calibration file, as indicated by block 50. Also, the inverse slopes and intercepts of the line connecting the overexposure curve to the normal exposure curve and the line connecting the underexposure curve to the normal exposure curve are calculated, as indicated by blocks 52 and 54, for use in the color correction algorithm.

Figure 6:
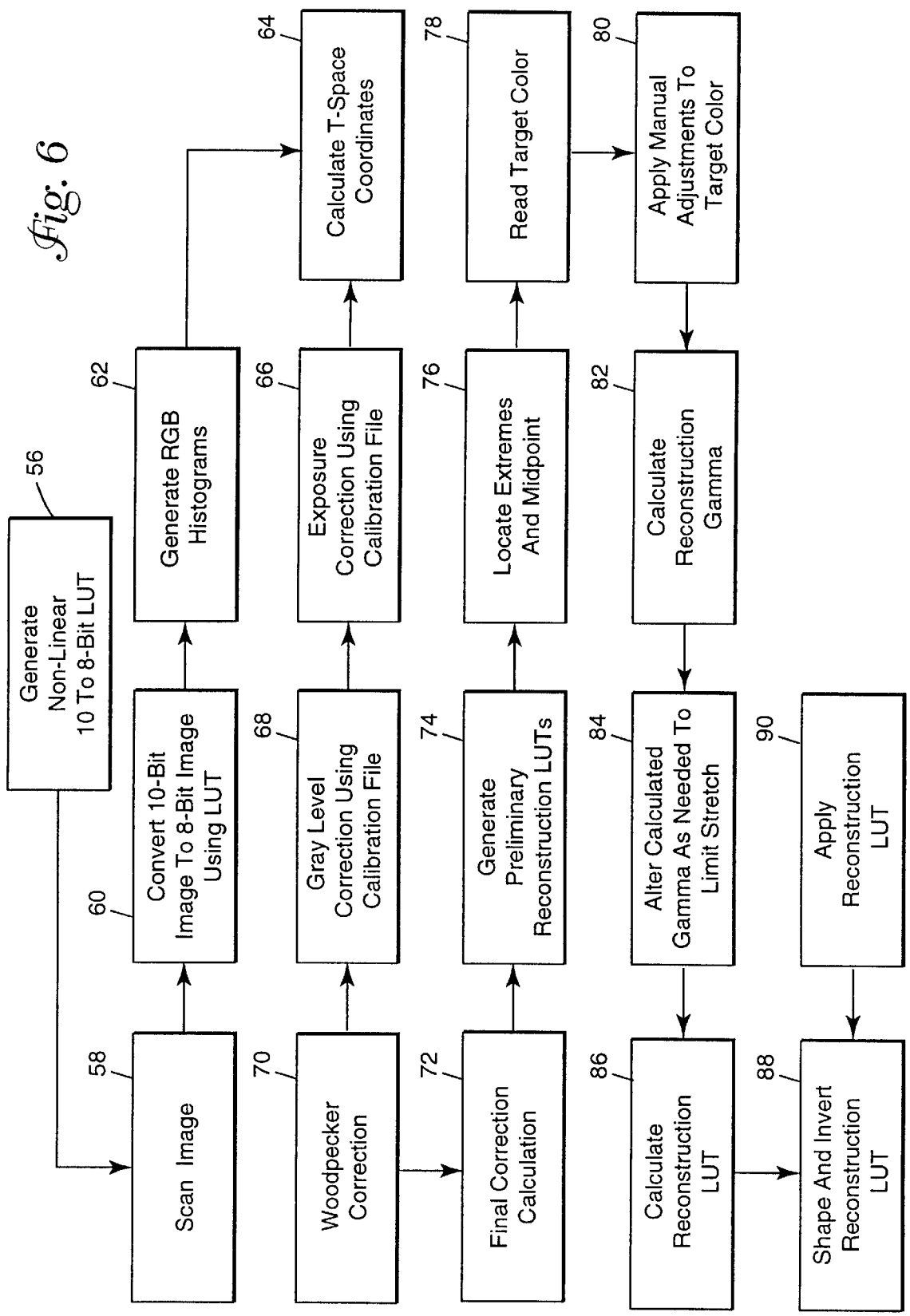
FIG. 6 is a flow diagram illustrating a scan correction and reconstruction method implemented by a system as shown in FIG. 1.

FIG. 6 is a flow diagram illustrating a scan correction and reconstruction method implemented as described above. As shown in FIG. 6, the non-linear conversion LUT is generated, as indicated by block 56. An image is then scanned and converted according to the LUT, as indicated by blocks 58 and 60. The converted image is processed by histogram generation module 18 to produce histogram information for the red, green, and blue channels, as indicated by block 62. Color correction/image reconstruction module 20 then calculates T-space coordinates for the image, as indicated by block 64. Using the calibration file generated as described with reference to FIG. 5, the image is corrected for over-exposure or under-exposure, as indicated by block 66.

Next, gray level correction is carried out, followed by chromatic correction, as indicated by blocks 68, 70, which pertain to gray level and subject failure suppression boundary (SFSB) correction, respectively. Calculation of final color correction data is undertaken, as indicated by block 72, by reference to the exposure correction and the gray level/chromatic correction.

The final correction is then used to form preliminary image reconstruction LUTs, as indicated by block 74. Following location of the extremes and midpoint of the preliminary reconstruction curve, as indicated by block 76, a target color for the particular film is read from memory or input by the user, as indicated by block 78. Optionally, a user then applies manual adjustments to the target color, as indicated by block 80, before a gamma curve for image reconstruction is calculated, as indicated by block 82.

If necessary, stretch is limited to reduce artifacts, as indicated by block 84. Then, an intermediate reconstruction LUT is calculated, as indicated by block 86. Following shaping and inversion of the reconstruction LUT, as indicated by block 88, the resulting LUT is applied to the image data to reconstruct the image, as indicated by block 90.

The present invention has been described primarily in the context of scanning negative color film. The algorithms implemented in accordance with the present invention may find ready application, however, in other film scanning systems. For example, black and white negatives could be handled by adapting the image reconstruction algorithm to handle single channel images. This can be accomplished by making all the channels the same, calibrating as usual, and scanning as usual. Further, the algorithms can be adapted to handle scanned positive (slide) film with some modification. The foregoing detailed description has been provided for a better understanding of the invention and is for exemplary purposes only. Modifications may be apparent to those skilled in the art, however, without deviating from the spirit and scope of the appended claims.

What is claimed is:

1. A method for correcting a digital color image scanned from film, the method comprising:
   producing average color value data for the scanned color image;
   performing exposure correction of the image using the average color value data and exposure calibration data;
   performing chromatic correction of the image using a subject failure suppression boundary following the exposure correction;
   generating image correction data representative of the exposure correction and the chromatic correction; and
   applying the image correction data to the image to produce a corrected color image.

2. The method of claim 1, further comprising:
   producing the average color value data by:
      producing histogram information representative of a distribution of RGB color values within the scanned color image, and
      determining average RGB color values within the image based on the histogram information;
   converting the average RGB color values to HSL coordinate values; and
   performing the exposure correction of the image using the HSL coordinate values and the exposure calibration data.

3. The method of claim 2, further comprising selecting the exposure calibration data based on the HSL coordinate values and a type of the film from which the color image was scanned.

4. The method of claim 3, further comprising selecting the exposure calibration data by:
   selecting a set of the exposure calibration data corresponding to the type of film from which the color image was scanned;
   determining whether the image was over-exposed, under-exposed, or normally exposed by comparing the HSL coordinate values to reference values; and
   selecting a subset of the exposure calibration data based on whether the image was over-exposed, under-exposed, or normally exposed.

5. The method of claim 4, further comprising performing the exposure correction by:
   adjusting the HSL lightness values for the image relative to HSL lightness values specified by the exposure calibration data; and
   adjusting HSL color values for the image relative to HSL color values specified by the exposure calibration data.

6. The method of claim 2, wherein the exposure calibration data includes multiple sets of exposure calibration data, each of the sets corresponding to a type of film from which the image was scanned and an exposure level of the image.

7. The method of claim 2, further comprising scanning the image such that each of the RGB color values has a color resolution of n bits, and reducing the color resolution of the RGB color values to m bits following the application of the image correction data to the image to produce the corrected color image.

8. A system for correcting a digital color image scanned from film, the system comprising:
   means for producing average color value data for the scanned color image;
   means for performing exposure correction of the image using the average color value data and exposure calibration data;
   means for performing chromatic correction of the image using a subject failure suppression boundary following the exposure correction;
   means for generating image correction data representative of the exposure correction and the chromatic correction; and
   means for applying the image correction data to the image to produce a corrected color image.

9. The system of claim 8, wherein the means for producing the average color value data produces histogram information representative of a distribution of RGB color values within the scanned color image, and determines average RGB color values within the image based on the histogram information, the system further comprising means for converting the average RGB color values to HSL coordinate values, wherein the means for performing exposure correction of the image uses the HSL coordinate values and the exposure calibration data.

10. The system of claim 9, further comprising means for selecting the exposure calibration data based on the HSL coordinate values and a type of the film from which the color image was scanned.

11. The system of claim 10, wherein the means for selecting the exposure calibration data further includes:
   means for selecting a set of the exposure calibration data corresponding to the type of film from which the color image was scanned;
   means for determining whether the image was over-exposed, under-exposed, or normally exposed by comparing the HSL coordinate values to reference values; and
   means for selecting a subset of the exposure calibration data based on whether the image was over-exposed, under-exposed, or normally exposed.

12. The system of claim 11, wherein the means for performing the exposure correction further includes:
   means for adjusting the HSL lightness values for the image relative to HSL lightness values specified by the exposure calibration data; and
   means for adjusting HSL color values for the image relative to HSL color values specified by the exposure calibration data.

13. The system of claim 9, wherein the exposure calibration data includes multiple sets of exposure calibration data, each of the sets corresponding to a type of film from which the image was scanned and an exposure level of the image.

14. The system of claim 9, further comprising means for scanning the image such that each of the RGB color values has a color resolution of n bits, and means for reducing the color resolution of the RGB color values to m bits following the application of the image correction data to the image to produce the corrected color image.

15. A method for reconstructing a digital color image scanned from film, the method comprising:
   producing average RGB color value data for the scanned color image;
   performing exposure correction of the image using the average color value data and exposure calibration data;
   performing chromatic correction of the image using a subject failure suppression boundary following the exposure correction;
   generating image correction data representative of the exposure correction and the chromatic correction;
   generating reconstruction lookup tables (LUTs) based on the color correction data and the average color value data, each of the reconstruction LUTs representing a curve for reconstruction of one of the RGB color channels for the image; and
   applying each of the reconstruction LUTs independently for the respective RGB color channels to produce a reconstructed color image.

16. The method of claim 15, further comprising:
   producing the average RGB color value data by:
      histogram information representative of a distribution of RGB color values within the scanned color image, and
      determining average RGB color values within the image based on the histogram information;
   converting the average RGB color values to HSL coordinate values; and
   performing the exposure correction of the image using the HSL coordinate values and the exposure calibration data.

17. The method of claim 16, wherein each of the reconstruction LUTs is a preliminary reconstruction LUT, and applying the reconstruction LUTs includes:
   adjusting each of the preliminary reconstruction LUTs by gamma correction based on the minima, maxima, and midpoint of the reconstruction curve;
   applying a shaping function to each of the adjusted preliminary reconstruction LUTs to thereby generate respective final reconstruction LUTs; and
   applying the final reconstruction LUTs to produce a reconstructed color image.

18. The method of claim 16, wherein each of the reconstruction LUT is a preliminary reconstruction LUT, and applying the reconstruction LUTs includes:
   selecting a target color value;
   adjusting each of the preliminary reconstruction LUTs to map the average RGB color value to the target color value and thereby generate respective final reconstruction LUTs; and
   applying the final reconstruction LUTs to produce a reconstructed color image.

19. The method of claim 16, further comprising selecting the exposure calibration data based on the HSL coordinate values and a type of the film from which the color image was scanned.

20. The method of claim 19, further comprising selecting the exposure calibration data by:
   selecting a set of the exposure calibration data corresponding to the type of film from which the color image was scanned;
   determining whether the image was over-exposed, under-exposed, or normally exposed by comparing the HSL coordinate values to reference values; and
   selecting a subset of the exposure calibration data based on whether the image was over-exposed, under-exposed, or normally exposed.

21. The method of claim 20, further comprising performing the exposure correction by:
   adjusting the HSL lightness values for the image relative to HSL lightness values specified by the exposure calibration data; and
   adjusting HSL color values for the image relative to HSL color values specified by the exposure calibration data.

22. The method of claim 16, wherein the exposure calibration data includes multiple sets of exposure calibration data, each of the sets corresponding to a type of film from which the image was scanned and an exposure level of the image.

23. The method of claim 16, further comprising scanning the image such that each of the RGB color values has a color resolution of n bits, and reducing the color resolution of the RGB color values to m bits following the application of the image correction data to the image to produce the corrected color image.

24. A system for reconstructing a digital color image scanned from film, the system comprising:
   means for producing average RGB color value data for the scanned color image;
   means for performing exposure correction of the image using the average color value data and exposure calibration data;
   means for performing chromatic correction of the image using a subject failure suppression boundary following the exposure correction;
   means for generating image correction data representative of the exposure correction and the chromatic correction;
   means for generating reconstruction lookup tables (LUTs) based on the color correction data and the average color value data, each of the reconstruction lookup tables representing a curve for reconstruction of one of the RGB color channels for the image; and
   means for applying each of the reconstruction LUTs independently for the respective RGB color channels to produce a reconstructed color image.

25. The system of claim 24, wherein the means for producing the average color value data produces histogram information representative of a distribution of RGB color values within the scanned color image, and determines average RGB color values within the image based on the histogram information, the system further comprising means for converting the average RGB color values to HSL coordinate values, wherein the means for performing the exposure correction of the image uses the HSL coordinate values and the exposure calibration data.

26. The system of claim 25, wherein each of the reconstruction LUTs is a preliminary reconstruction LUT, and the means for applying the reconstruction LUTs includes:
   means for adjusting each of the preliminary reconstruction LUTs by gamma correction based on the minima, maxima, and midpoint of the reconstruction curve;

means for applying a shaping function to each of the adjusted preliminary reconstruction LUTs to thereby generate respective final reconstruction LUTs; and means for applying the final reconstruction LUTs to produce a reconstructed color image.

27. The system of claim 25, wherein each of the reconstruction LUTs is a preliminary reconstruction LUT, and the means for applying the reconstruction LUTs includes:

means for selecting a target color value;

means for adjusting each of the preliminary reconstruction LUTs to map the average RGB color value to the target color value and thereby generate respective final reconstruction LUTs; and means for applying the final reconstruction LUTs to produce a reconstructed color image.

28. The system of claim 25, further comprising means for selecting the exposure calibration data based on the HSL coordinate values and a type of the film from which the color image was scanned.

29. The system of claim 25, wherein the means for selecting the exposure calibration data includes:

means for selecting a set of the exposure calibration data corresponding to the type of film from which the color image was scanned;

means for determining whether the image was over-exposed, under-exposed, or normally exposed by comparing the HSL coordinate values to reference values; and means for selecting a subset of the exposure calibration data based on whether the image was over-exposed, under-exposed, or normally exposed.

30. The system of claim 29, wherein the means for performing the exposure correction includes:

means for adjusting the HSL lightness values for the image relative to HSL lightness values specified by the exposure calibration data; and means for adjusting HSL color values for the image relative to HSL color values specified by the exposure calibration data.

31. The system of claim 25, wherein the exposure calibration data includes multiple sets of exposure calibration data, each of the sets corresponding to a type of film from which the image was scanned and an exposure level of the image.

32. The system of claim 25, further comprising means for scanning the image such that each of the RGB color values has a color resolution of n bits, and means for reducing the color resolution of the RGB color values to m bits following the application of the image correction data to the image to produce the corrected color image.

33. A method for correcting a digital color image scanned from film, the method comprising:

producing average color value data for the scanned color image;

performing exposure correction of the image using the average color value data and exposure calibration data;

performing chromatic correction of the image using a subject failure suppression boundary following the exposure correction;

generating image correction data representative of the exposure correction and the chromatic correction; and applying the image correction data to the image to produce a corrected color image.

34. A system for correcting a digital color image scanned from film, the system comprising:

means for producing average color value data for the scanned color image;

means for performing exposure correction of the image using the average color value data and exposure calibration data;

means for performing chromatic correction of the image using a subject failure suppression boundary following the exposure correction;

means for generating image correction data representative of the exposure correction and the chromatic correction; and means for applying the image correction data to the image to produce a corrected color image.

* * * * *